(12) United States Patent
Liu et al.

(10) Patent No.: US 11,791,960 B2
(45) Date of Patent: *Oct. 17, 2023

(54) RESOURCE CONFIGURATION METHOD AND DEVICE

(71) Applicant: HUAWEI TECHNOLOGIES CO., LTD., Guangdong (CN)

(72) Inventors: Yong Liu, Shanghai (CN); Lu Rong, Shenzhen (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,573

(22) Filed: Sep. 2, 2022

(65) Prior Publication Data

US 2022/0416965 A1 Dec. 29, 2022

Related U.S. Application Data

(63) Continuation of application No. 16/360,324, filed on Mar. 21, 2019, now Pat. No. 11,464,020, which is a (Continued)

(30) Foreign Application Priority Data

May 5, 2017 (CN) .......................... 201710312449.5

(51) Int. Cl.
*H04L 5/00* (2006.01)
*H04W 72/0453* (2023.01)
(Continued)

(52) U.S. Cl.
CPC .......... *H04L 5/0044* (2013.01); *H04L 5/0092* (2013.01); *H04W 72/0453* (2013.01);
(Continued)

(58) Field of Classification Search
CPC ............. H04W 72/0453; H04W 72/08; H04W 72/1226; H04B 7/0456; H04B 7/0626
See application file for complete search history.

(56) References Cited

U.S. PATENT DOCUMENTS

2011/0170498 A1  7/2011  Liu et al.
2011/0255483 A1  10/2011  Xu et al.
(Continued)

FOREIGN PATENT DOCUMENTS

CN  101281454  10/2008
CN  102404036  4/2012
(Continued)

OTHER PUBLICATIONS

3GPP TS 36.213 V14.2.0 (Mar. 2017), "3rd Generation Partnership Project; Technical Specification Group Radio Access Network; Evolved Universal Terrestrial Radio Access (E-UTRA); Physical layer procedures (Release 14)," Mar. 2017, 454 pages.
(Continued)

*Primary Examiner* — Jackie Zuniga Abad
(74) *Attorney, Agent, or Firm* — Fish & Richardson P.C.

(57) ABSTRACT

Embodiments of this application disclose a resource configuration method and a device. The method includes: generating, by a transmit end device, configuration information, where the configuration information is used to indicate at least one resource bundling size, the resource bundling size belongs to a resource bundling size set, and the resource bundling size set corresponds to at least one system configuration parameter; and sending, by the transmit end device, the configuration information.

32 Claims, 5 Drawing Sheets

Related U.S. Application Data continuation of application No. PCT/CN2018/085175, filed on Apr. 28, 2018.

(51) Int. Cl.
  *H04W 72/54* (2023.01)
  *H04B 7/06* (2006.01)
  *H04B 7/0456* (2017.01)
  *H04L 27/26* (2006.01)

(52) U.S. Cl.
  CPC ........... *H04W 72/54* (2023.01); *H04B 7/0456* (2013.01); *H04B 7/0626* (2013.01); *H04L 5/0007* (2013.01); *H04L 5/008* (2013.01); *H04L 27/2602* (2013.01)

(56) References Cited

U.S. PATENT DOCUMENTS

| | | | |
|---|---|---|---|
| 2011/0255505 A1* | 10/2011 | Liu | H04L 5/0044 370/330 |
| 2013/0077560 A1 | 3/2013 | Horiuchi et al. | |
| 2013/0182619 A1 | 7/2013 | Tiirola et al. | |
| 2013/0242947 A1 | 9/2013 | Chen et al. | |
| 2013/0294333 A1 | 11/2013 | Chen et al. | |
| 2015/0365209 A1 | 12/2015 | Yi et al. | |
| 2016/0135170 A1 | 5/2016 | Chen et al. | |
| 2016/0163015 A1 | 6/2016 | Riguer et al. | |
| 2016/0227513 A1 | 8/2016 | Vajapeyam et al. | |
| 2016/0227520 A1 | 8/2016 | Davydov et al. | |
| 2018/0324760 A1 | 11/2018 | Yuk et al. | |
| 2020/0275416 A1 | 8/2020 | Haghighat et al. | |

FOREIGN PATENT DOCUMENTS

| | | |
|---|---|---|
| CN | 102638337 | 8/2012 |
| CN | 102948243 | 2/2013 |
| CN | 102971978 | 3/2013 |
| CN | 104969490 | 10/2015 |
| CN | 105677479 | 6/2016 |
| CN | 106559182 | 4/2017 |
| JP | 2013516936 | 5/2013 |
| JP | 2013524718 | 6/2013 |
| WO | 2016154835 A1 | 10/2016 |
| WO | WO 2018082010 | 5/2018 |

OTHER PUBLICATIONS

Extended European Search Report issued in European Application No. 18794184.4 dated Jul. 29, 2019, 10 pages.
Huawei, HiSilicon, "PRB bundling size for DL data precoding," 3GPP TSG RAN WG1 Meeting #88bis, R1-1705074, Spokane, USA. Apr. 3-7, 2017, 7 pages.
Huawei, HiSilicon, "PRB bundling size for DL data precoding," 3GPP TSG RAN WG1 NR Ad Hoc Meeting, R1-1700413, Spokane, USA, Jan. 16-20, 2017, 6 pages.
Huawei, HiSilicon, "PRB bundling size for DL data precoding," 3GPP TSG RAN WG1 Meeting #88, R1-1703342, Athens, Greece, Feb. 13-17, 2017, 7 pages.
Office Action issued in Chinese Application No. 201810835220.4 dated Apr. 10, 2019, 9 pages.
Office Action issued in Chinese Application No. 201810835738.4 dated Apr. 17, 2019, 18 pages (with English translation).
Office Action issued in Chinese Application No. 201810835238.4 dated Aug. 2, 2019, 4 pages.
Office Action issued in Japanese Application No. 2019-508233 dated Nov. 25, 2019, 8 pages (with English translation).
Office Action issued in Korean Application No. 2019-7003486 dated Oct. 23, 2020, 4 pages (with English translation).
PCT International Search Report and Written Opinion issued in International Application No. PCT/CN2018/085175 dated Jul. 4, 2018, 11 pages.
Samsung, "PRB bundling for NR DMRS," 3GPP TSG RAN WG1 Meeting #89, R1-1707947, Hangzhou, P.R. China, May 15-19, 2017, 4 pages.
Xinwei, "Evaluation and Discussion on PRB Bundling Size," 3GPP TSG RAN WG1#88b, R1-1704662; Spokane, Washington, Apr. 3-7, 2017, 7 pages.
Zte et al., "On PRB Bundling," 3GPP TSG RAN WG1 Meeting #88bis, R1-1704396, Spokane, USA, Apr. 3-7, 2017, 4 pages.
Office Action in Chinese Appln. No. 201880029449.7, dated Mar. 11, 2023, 10 pages.

* cited by examiner

RESOURCE CONFIGURATION METHOD AND DEVICE

CROSS-REFERENCE TO RELATED APPLICATIONS

This application is a continuation of U.S. patent application Ser. No. 16/360,324, filed on Mar. 21, 2019, which is a continuation of International Application No. PCT/CN2018/085175, filed on Apr. 28, 2018, which claims priority to Chinese Patent Application No. 201710312449.5, filed on May 5, 2017. All of the afore-mentioned patent applications are hereby incorporated by reference in their entireties.

TECHNICAL FIELD

This application relates to the field of communications technologies, and in particular, to a resource configuration method and a device.

BACKGROUND

In a multiple input multiple output (English: Multiple Input Multiple Output, MIMO for short) system, PRB bundling is a technology used to improve channel estimation performance. According to a technical solution of PRB bundling, sizes (size) of contiguous PRBs (Physical resource block) using a same preprocessing manner (including beamforming and precoding) are agreed, and the size is usually greater than 1, so that a terminal performs joint channel estimation by using a plurality of PRBs. When the terminal performs joint channel estimation based on a plurality of PRBs, extrapolation calculations of channel estimation can be reduced. During channel estimation, a channel estimation value obtained through an extrapolation calculation has a relatively large deviation. Therefore, channel estimation accuracy can be improved by reducing extrapolation calculations (by converting an extrapolation calculation into an interpolation calculation).

From a perspective of channel estimation, a larger PRB bundling size leads to higher channel estimation accuracy. However, when the PRB bundling size is increased to a particular value, a channel estimation accuracy gain no longer increases. Therefore, the PRB bundling size does not need to increase infinitely, but only needs a limited quantity of values to be defined. The channel estimation accuracy gain brought by an increase in the PRB bundling size is also related to a channel environment. For example, a flatter frequency domain channel leads to a smaller channel estimation extrapolation loss. In such a scenario, the channel estimation accuracy gain brought by the increase the PRB bundling size is limited.

In addition, a larger PRB bundling size leads to more complex channel estimation. Therefore, from a perspective of terminal implementation complexity, only a limited quantity of values can be defined for the PRB bundling size.

In addition to a PRB bundling size, other LTE frequency domain sizes such as a resource scheduling frequency domain size, a precoding frequency domain size, and a channel state information feedback frequency domain size have the same problem. For example, a mapping manner of binding to system bandwidth is not flexible enough, and often limits DMRS estimation performance. For example, for channels in different scenarios, channel characteristics cannot be well summarized by using only the system bandwidth. For example, in 4 GHz and 70 GHz carrier frequency scenarios, frequency selectivity corresponding to same system bandwidth differs greatly, and corresponding bundling sizes for obtaining optimal estimation performance also differ greatly.

SUMMARY

To flexibly configure a resource bundling size to effectively optimize system performance in different scenario conditions, embodiments of this application provide a resource configuration method, a network device, and a terminal.

According to one aspect, an embodiment of this application provides a resource configuration method, including:

generating, by a transmit end device, configuration information and sending the configuration information to a receive end device, where the configuration information is used to indicate at least one resource bundling size, the resource bundling size belongs to a resource bundling size set, and the resource bundling size set corresponds to at least one system configuration parameter; and the resource bundling size may also be referred to as a resource group size, and includes at least one of a resource scheduling frequency domain size, a physical resource block bundling size, a precoding frequency domain size, and a channel state information feedback frequency domain size, and correspondingly, the resource bundling size set may also be referred to as a resource group size set or is briefly referred to as a resource bundling set or a resource group set; and receiving, by the receive end device, the configuration information from the transmit end device, and determining a resource bundling size based on the configuration information.

There are abundant types of resource bundling sizes in this application. For example, the precoding frequency domain size may be provided as a basis for the terminal to perform precoding. For example, the physical resource block bundling size may be provided as a basis for the terminal to perform data demodulation and channel estimation, or the like. Therefore, this embodiment of this application can adapt to various scenarios, improving system performance.

In a possible design, the resource bundling size set corresponds to at least one system configuration parameter. The system configuration parameter includes at least one of a system radio carrier frequency parameter, a system bandwidth parameter, a system subcarrier spacing parameter, a service scenario parameter, and a transmission scheme parameter. In this way, signaling overheads can be reduced.

In a possible design, before the transmit end device generates the configuration information, the receive end device reports, to the transmit end device, information indicating a resource bundling size, so that the transmit end device may generate the configuration information with reference to the feedback of the receive end device. In this way, the method is applicable to various types of receive end devices and can reduce signaling overheads.

In a possible implementation, before the receive end device reports, to the transmit end device, the information indicating the resource bundling size, that the receive end device determines the resource bundling size to be reported by the receive end device includes:

determining, by the receive end device, the resource bundling size to be reported by the receive end device, based on a channel measurement result, or based on a correspondence between a resource bundling size and transmission performance, or based on a parameter that is received from the transmit end device.

In a possible implementation, that the receive end device reports, to the transmit end device, information indicating a resource bundling size includes:

directly sending, by the receive end device to the transmit end device, information indicating how many resource blocks the resource bundling size includes; or sending, by the receive end device to the transmit end device, information indicating a resource bundling size change; or sending, by the receive end device to the transmit end device, a multiple relationship between the resource bundling size and a basic resource bundling size, where the basic resource bundling size is agreed in advance between the transmit end device and the receive end device or preconfigured based on network signaling; or sending, by the receive end device, information to the transmit end device based on a resource bundling size configuration table that is agreed in advance with the transmit end device, to indicate that the resource bundling size determined by the receive end device is one or more resource bundling sizes in the resource bundling size configuration table; or sending, by the receive end device, information to the transmit end device based on a plurality of resource bundling size configuration tables that are agreed in advance with the transmit end device, to indicate a specific resource bundling size configuration table for use by the resource bundling size determined by the receive end device.

In a possible implementation, the receive end device performs resource scheduling, or precoding, or channel estimation, or data demodulation after determining the resource bundling size.

According to another aspect, this application provides a transmit end device, including:

a processor, configured to generate configuration information, where the configuration information is used to indicate at least one resource bundling size, the resource bundling size belongs to a resource bundling size set, and the resource bundling size set corresponds to at least one system configuration parameter; and a transceiver, configured to send the configuration information generated by the processor.

According to still another aspect, this application further provides a receive end device, including:

a transceiver, configured to receive configuration information, where the configuration information is used to indicate at least one resource bundling size, the resource bundling size belongs to a resource bundling size set, and the resource bundling size set corresponds to at least one system configuration parameter; and a processor, configured to determine a resource bundling size based on the configuration information.

In a possible implementation, the processor is further configured to determine information that is reported by the receive end device and that indicates a resource bundling size, and specifically, determine the resource bundling size to be reported by the receive end device, based on a channel measurement result, or based on a correspondence between a resource bundling size and transmission performance, or based on a parameter received by the transceiver from a network device.

In a possible implementation, the transceiver directly sends, to the transmit end device, information indicating how many resource blocks the resource bundling size includes; or sends, to the transmit end device, information indicating a resource bundling size change; or sends, to the transmit end device, a multiple relationship between the resource bundling size and a basic resource bundling size, where the basic resource bundling size is agreed in advance between the transmit end device and the receive end device or preconfigured based on network signaling; or sends information to the transmit end device based on a resource bundling size configuration table that is agreed in advance with the transmit end device, to indicate that the resource bundling size determined by the receive end device is one or more resource bundling sizes in the resource bundling size configuration table; or sends information to the transmit end device based on a plurality of resource bundling size configuration tables that are agreed in advance with the transmit end device, to indicate a specific resource bundling size configuration table for use by the resource bundling size determined by the receive end device.

In a possible implementation, the processor is further configured to perform channel estimation or data demodulation after determining the resource bundling size.

In the embodiments of this application, the transmit end device may be a network device, and the receive end device is a terminal; or the transmit end device is a terminal, and the receive end device is a network device.

According to yet another aspect, a resource configuration apparatus is provided, configured to perform the foregoing resource configuration method. Specifically, the apparatus includes a processor and an interface that are configured to perform the foregoing resource configuration method in any possible implementation of the foregoing resource configuration method.

The resource configuration apparatus may be a chip. When the processor is implemented by hardware, the processor may be a logical circuit, an integrated circuit, or the like. When the processor is implemented by software, the processor may be a general-purpose processor, and is implemented by reading software code stored in a memory. The memory may be integrated into the processor, or may be located outside the processor and exists independently.

According to still yet another aspect, a communications system is provided. The system includes any possible implementation of the foregoing resource configuration apparatus.

According to a further aspect, a computer-readable medium is provided, configured to store a computer program. The computer program includes an instruction used to perform the method in any of the foregoing possible implementations.

Beneficial effects brought by the technical solutions provided in the embodiments of this application are as follows:

According to the resource configuration method, the transmit end device, and the receive end device that are provided in the embodiments of this application, the transmit end device generates resource configuration information, and the receive end device may determine a resource bundling size based on the resource configuration information. Compared with the prior art in which a resource size is bound only to system bandwidth, the technical solutions provided in the embodiments of this application can flexibly determine a proper resource bundling size from a resource bundling size set based on at least one system configuration parameter, to adapt to different application scenarios. Therefore, by using the technical solutions provided in the embodiments of this application, a requirement of a wireless communications system for diversified scenarios can be met, and system performance can be effectively optimized in different scenarios.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

According to technical solutions provided in embodiments of this application, resource configuration information is sent, and a receive end can determine a resource bundling size based on the resource configuration information. Compared with the prior art in which a resource size is bound only to system bandwidth, the technical solutions provided in the embodiments of this application can flexibly determine a proper resource bundling size from a resource bundling size set based on at least one system configuration parameter, to adapt to different application scenarios. Therefore, by using the technical solutions provided in the embodiments of this application, a requirement of a wireless communications system for diversified scenarios can be met, and system performance can be effectively optimized in different scenarios.

The technical solutions provided in the embodiments of this application are described below in detail with reference to corresponding accompanying drawings.

Figure 1:
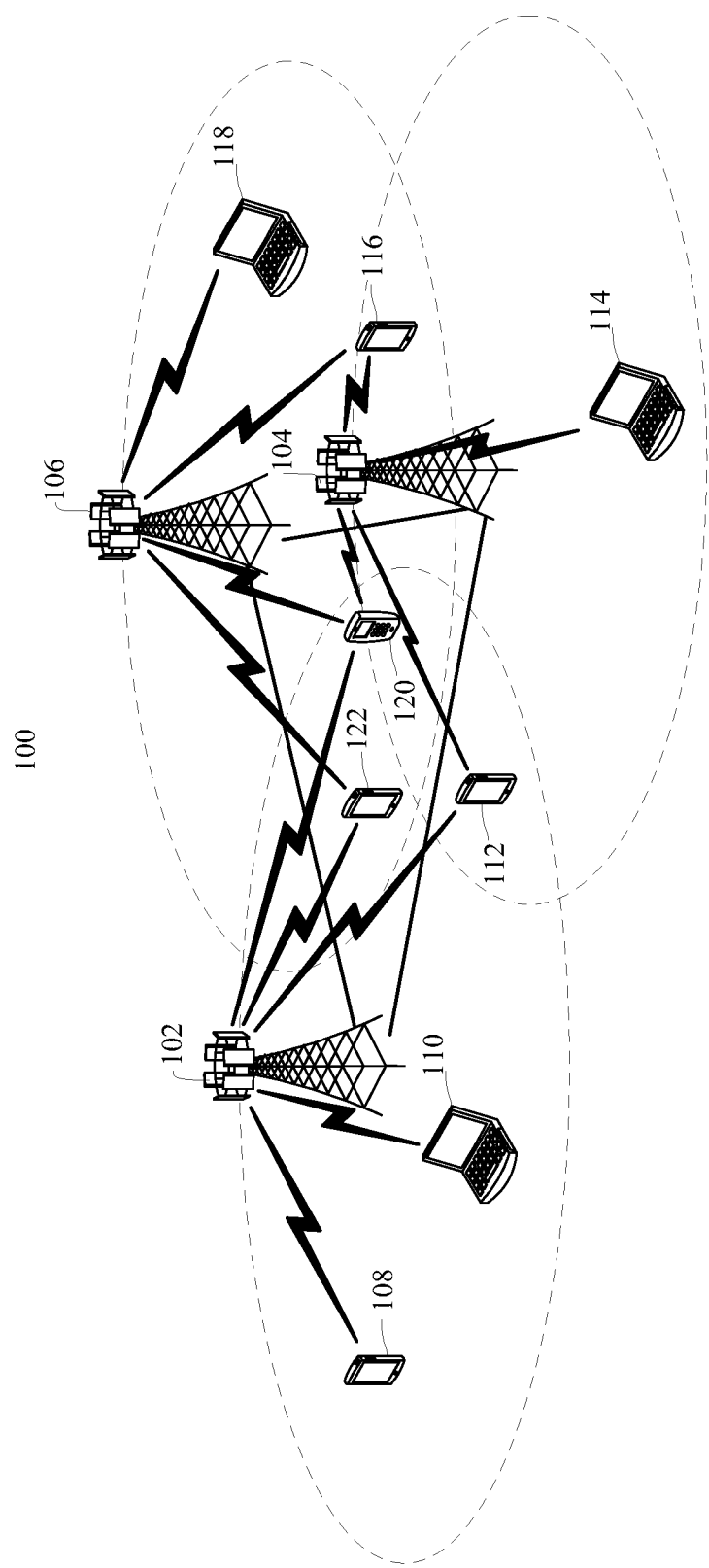
FIG. 1 is a schematic diagram of an example of a wireless communications network according to an embodiment of this application.

FIG. 1 is a schematic diagram of an example of a wireless communications network 100 according to an embodiment of this application. As shown in FIG. 1, the wireless communications network 100 includes base stations 102 to 106 and terminal devices 108 to 122. The base stations 102 to 106 may communicate with each other by using backhaul links (shown by straight lines between the base stations 102 to 106). The backhaul link may be a wired backhaul link (for example, an optical fiber or a copper cable), or may be a wireless backhaul link (for example, microwave). The terminal devices 108 to 122 may communicate with the corresponding base stations 102 to 106 by using radio links (shown by polygonal lines between the base stations 102 to 106 and the terminal devices 108 to 122).

The base stations 102 to 106 are configured to provide a wireless access service for the terminal devices 108 to 122. Specifically, each base station corresponds to one service coverage area (which may also be referred to as a cell, and is shown by each elliptical area in FIG. 1). A terminal device entering the area may communicate with the base station by using a radio signal, to receive the wireless access service provided by the base station. Service coverage areas of the base stations may overlap, and a terminal device in an overlapping area may receive radio signals from a plurality of base stations. Therefore, the plurality of base stations may simultaneously serve the terminal device. For example, the plurality of base stations may serve the terminal device in the overlapping area by using a coordinated multipoint (CoMP) technology. For example, as shown in FIG. 1, service coverage areas of the base station 102 and the base station 104 overlap, and the terminal device 112 is in the overlapping area. Therefore, the terminal device 112 may receive radio signals from the base station 102 and the base station 104, and the base station 102 and the base station 104 may simultaneously serve the terminal device 112. For another example, as shown in FIG. 1, service coverage areas of the base station 102, the base station 104, and the base station 106 have a common overlapping area, and the terminal device 120 is in the overlapping area. Therefore, the terminal device 120 may receive radio signals from the base station 102, the base station 104, and the base station 106, and the base station 102, the base station 104, and the base station 106 may simultaneously serve the terminal device 120.

Depending on a to-be-used wireless communications technology, the base station may also be referred to as a NodeB, an evolved NodeB (eNodeB), an access point (AP), or the like. In addition, based on sizes of provided service coverage areas, the base stations may be divided into a macro base station configured to provide a macro cell, a micro base station configured to provide a micro cell (Pico cell), and a femto base station configured to provide a femto cell. With continuous evolution of wireless communications technologies, a future base station may have another name.

The terminal devices 108 to 122 may be various wireless communications devices having a wireless communication function, for example but not limited to, a mobile cellular phone, a cordless telephone set, a personal digital assistant (PDA), a smartphone, a notebook computer, a tablet computer, a wireless data card, a wireless modem (Modulator-demodulator, Modem), or a wearable device such as a smartwatch. With rise of the Internet of Things (JOT) technology, a growing quantity of devices that previously do not have a communication function, for example but not limited to, household appliances, vehicles, tools, service devices, and service facilities, begin to obtain the wireless communication function by configuring a wireless communications unit, so that they access a wireless communications network and are remotely controlled. Such devices have the wireless communication function because they are configured with the wireless communications unit, and therefore also fall within a scope of wireless communications devices. In addition, the terminal devices 108 to 122 each may also be referred to as a mobile station, a mobile device, a mobile terminal, a wireless terminal, a handheld device, a client, or the like.

The base stations 102 to 106 and the terminal devices 108 to 122 may be all configured with a plurality of antennas, to support a MIMO (Multiple Input Multiple Output) technology. Further, the terminal devices 108 to 122 may support a single-user MIMO (Single-User MIMO, SU-MIMO) technology, and may also support multi-user MIMO (Multi-User MIMO, MU-MIMO). The MU-MIMO may be implemented based on a space division multiple access (SDMA) technology. Because being configured with the plurality of antennas, the base stations 102 to 106 and the terminal devices 108 to 122 may further flexibly support a single input single output (SISO) technology, a single input multiple output (SIMO) technology, and a multiple input single output (MISO) technology, to implement various diversity (for example but not limited to, transmit diversity and receive diversity) and multiplexing technologies. The diversity technology may include, for example but not limited to, a transmit diversity (TD) technology and a receive diversity (RD) technology. The multiplexing technology may be a spatial multiplexing technology. Furthermore, the foregoing technologies may further include a plurality of implementation schemes. For example, currently frequently used transmit diversity may include diversity manners, for example but not limited to, space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity manners obtained after derivation, evolution, and combination of the foregoing diversity manners. For example, in a current LTE (Long Term Evolution, Long Term Evolution) standard, transmit diversity manners such as space time block coding (STBC), space frequency block coding (SFBC), and the CDD are used.

In addition, the base stations 102 to 106 may communicate with the terminal devices 108 to 122 by using various wireless communications technologies, for example but not limited to, a time division multiple access (TDMA) technology, a frequency division multiple access (Access, FDMA) technology, a code division multiple access (CDMA) technology, a time division-synchronous code division multiple access (TD-SCDMA) technology, an orthogonal frequency division multiple access (Orthogonal FDMA, OFDMA) technology, a single carrier frequency division multiple access (Single Carrier FDMA, SC-FDMA) technology, a space division multiple access (SDMA) technology, and technologies evolved and derived from these technologies. The foregoing wireless communications technologies are adopted as a radio access technology (RAT) in numerous wireless communications standards, to construct various wireless communications systems (or networks) nowadays widely known to people, including but not limited to, a Global System for Mobile Communications (GSM), CDMA2000, Wideband CDMA (WCDMA), Wi-Fi defined in the 802.11 series standard, Worldwide Interoperability for Microwave Access (Worldwide Interoperability for Microwave Access, WiMAX), Long Term Evolution (LTE), LTE-Advanced (LTE-A), systems evolved from these wireless communications systems, and the like. The wireless communications network shown in FIG. 1 may be any system or network in the foregoing wireless communications systems. Unless otherwise stated, the technical solutions provided in the embodiments of this application may be applied to the foregoing wireless communications technologies and wireless communications systems. In addition, the terms "system" and "network" can be interchangeable.

It should be noted that the wireless communications network 100 shown in FIG. 1 is only an example, and is not intended to limit the technical solutions of this application. A person skilled in the art should understand that in a specific implementation process, the wireless communications network 100 further includes another device, for example but not limited to, a base station controller (BSC), and quantities of base stations and terminal devices may be configured based on a specific need.

In an existing LTE system, a resource size is determined based only on system bandwidth. In other words, in the existing LTE, the resource size is bound or mapped only to the system bandwidth. A configuration manner is undiversified, and there is only one resource bundling size. Consequently, it is not flexible, and it is difficult to optimize system performance in different scenario conditions.

For example, scenario conditions of a high frequency system and a low frequency system differ greatly. The high frequency system has a quite high carrier frequency with relatively small coverage, and uses a narrow beam with very small multipath delay spread, and a frequency domain channel of the high frequency system is much flatter than that of a low frequency scenario. If a same resource bundling size configuration is used for a high frequency system and a low frequency system without considering the differences, it is difficult for the two to both achieve relatively desirable performance.

For another example, compared with when there is no direct path between a terminal and a network device, when there is a direct path between the terminal and the network device, a frequency domain channel is flatter with smaller multipath delay spread. Channel conditions of an indoor terminal and an outdoor terminal also differ greatly. If a same resource size configuration is used for all terminals at all time without considering the differences, it is difficult to take account of different terminal channel conditions.

Therefore, this application designs a resource bundling size set (resource bundling size set). The set includes at least one resource bundling size (resource bundling size). According to the technical solutions provided in the embodiments of this application, a proper resource bundling size can be flexibly determined from a resource bundling size set, to adapt to different application scenarios. It should be understood that the resource bundling size described in the embodiments of this application may also be referred to as a resource bundling granularity.

The following describes in detail an implementation process of a resource configuration method provided in this application.

Figure 2:
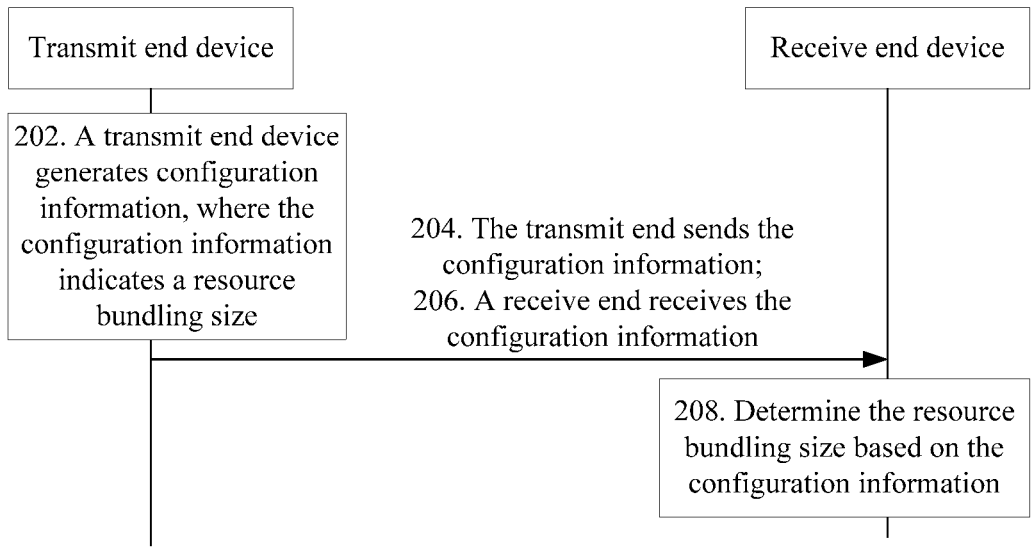
FIG. 2 is a schematic diagram of an example of a resource configuration method according to an embodiment of this application.

FIG. 2 is a flowchart of an example of a resource configuration method 200 according to an embodiment of this application. In a specific implementation process, a transmit end device may be, for example but not limited to, the terminal devices 108 to 122 or the base stations 102 to 106 in FIG. 1; a receive end device may be, for example but not limited to, the base stations 102 to 106 or the terminal devices 108 to 122 in FIG. 1. It should be understood that the base stations 102 to 106 and the terminal devices 108 to 122 are peer devices respectively at a transmit end and at a receive end.

Step 202: The transmit end device generates configuration information, where the configuration information is used to indicate at least one resource bundling size, the resource bundling size belongs to a resource bundling size set, and the resource bundling size set corresponds to at least one system configuration parameter. The resource bundling size may also be referred to as a resource group size; and the resource bundling size set may also be referred to as a resource group size set or is briefly referred to as a resource bundling set or a resource group set.

Step 204: The transmit end device sends the configuration information.

Step 206: The receive end device receives the configuration information.

Step 208: The receive end device determines a resource bundling size based on the configuration information.

In the method 200, the configuration information generated by the transmit end device is used to indicate a resource bundling size set that includes at least one resource bundling size, and one or more resource bundling size sets may be configured to adapt to different service scenarios.

In a possible implementation, the resource bundling size set includes a resource bundling size corresponding to a user configuration parameter, and the user configuration parameter includes: scheduling bandwidth for a terminal, or minimum continuous scheduling bandwidth for the terminal, or a divisor of continuous scheduling bandwidth for the terminal. The resource bundling size corresponding to the user configuration parameter may be a status variable. For example, the status variable instructs a target terminal to use entire or partial scheduling bandwidth. For example, in a current scheduling process, 10 physical resource blocks (PRB) are scheduled for the terminal, and when a parameter is indicated, a size is 10 PRBs; or 20 PRBs are scheduled for the terminal in a scheduling process, and when another parameter is indicated, a size is 20 PRBs.

In this embodiment of this application, the resource bundling size set corresponds to at least one system configuration parameter, and the system configuration parameter may be a system radio carrier frequency parameter, a system bandwidth parameter, a system subcarrier spacing parameter, a service scenario parameter, or a transmission scheme parameter; and a resource bundling size in the resource bundling size set may be at least one of a resource scheduling frequency domain size, a physical resource block bundling size, a precoding frequency domain size, and a channel state information CSI feedback frequency domain size.

In this way, a resource bundling size is not only related to system bandwidth, but also may correspond to another system configuration parameter. Furthermore, the resource bundling size may be used to determine a physical resource block frequency domain size, a resource scheduling frequency domain size, a precoding frequency domain size, a CSI feedback frequency domain size, and a transmission scheme frequency domain sizes. This is flexible and diverse, and adapts to different scenario changes.

Correspondingly, the configuration information may be resource scheduling configuration information, or physical resource block configuration information, or precoding configuration information, or channel state information feedback configuration information, or transmission scheme configuration information.

In a specific implementation process, in step 204, the transmit end device sends the configuration information.

In this embodiment of this application, the transmit end device may explicitly or implicitly send the resource bundling size.

In one aspect, if the transmit end device does not send explicit signaling to the receive end device for indication, the receive end device uses, by default, a resource bundling size in a resource bundling size set corresponding to a system parameter, for example, the first or the last resource bundling size.

In another aspect, the transmit end device may alternatively send a resource bundling size in a particular resource bundling set to the receive end device by using the configuration information.

In both of the foregoing two manners, after receiving the configuration information, the receive end device may obtain a corresponding resource bundling size, and may perform a corresponding operation based on the resource bundling size, for example, perform resource scheduling, or precoding, or channel estimation, or data demodulation.

Sending the configuration information by using explicit signaling may be sending the configuration information by using one piece of the following air interface signaling:
broadcast signaling;
unicast signaling;
physical layer signaling;
Media Access Control layer signaling; and
Radio Resource Control signaling.

The physical layer signaling is also referred to as Layer 1 (L1) signaling, and usually may be carried by a control portion of a physical layer frame. A typical example of the L1 signaling is downlink control information (DCI) that is carried in a physical downlink control channel (PDCCH) as defined in an LTE standard. In some cases, the L1 signaling may alternatively be carried by a data portion of the physical layer frame. It can be easily learned that, a transmission period or a signaling period of the L1 signaling is usually a period of the physical layer frame. Therefore, the signaling is usually used to implement some dynamic control, to transfer some frequently changing information. For example, the physical layer signaling may be used to transfer resource allocation information.

The Media Access Control (MAC) layer signaling belongs to Layer 2 signaling, and usually may be carried by, for example but not limited to, a frame header of a Layer 2 frame. The frame header may further carry, for example but not limited to, information such as a source address and a destination address. The Layer 2 frame usually further includes a frame body, in addition to the frame header. In some cases, the L2 signaling may alternatively be carried by the frame body of the Layer 2 frame. A typical example of the Layer 2 signaling is signaling carried in a frame control field in a frame header of a MAC frame in the 802.11 series standard, or a MAC control entity (CE) defined in some protocols. The Layer 2 frame usually may be carried in a data portion of a physical layer frame. Alternatively, the foregoing resource configuration information may be sent by using other Layer 2 signaling than the Media Access Control layer signaling.

The Radio Resource Control (RRC) signaling belongs to Layer 3 signaling, and is usually some control messages. The L3 signaling usually may be carried in a frame body of a Layer 2 frame. The L3 signaling usually has a relatively long transmission period or control period, and is suitable for sending some information that does not frequently change. For example, in some existing communications standards, the L3 signaling is usually used to carry some configuration information. Alternatively, the foregoing resource configuration information may be sent by using other Layer 3 signaling than the RRC signaling.

The foregoing is merely principle description of the physical layer signaling, the MAC layer signaling, the RRC signaling, the Layer 1 signaling, the Layer 2 signaling, and the Layer 3 signaling. For details about the three types of signaling, refer to the prior art. Therefore, details are not described again in this specification.

In step 206, the receive end device receives the configuration information from the transmit end device.

In step 208, the receive end device determines a resource bundling size based on the configuration information. In a specific implementation, the receive end device is configured to determine a corresponding resource bundling size set based on a default system configuration parameter or based on an indication of air interface signaling sent by the transmit end device, or further determine a corresponding resource bundling size based on the default system configuration parameter or based on the indication of the air interface signaling sent by the transmit end device.

For example, the receive end device determines, based on the default system configuration parameter, a resource bundling size set corresponding to the system configuration parameter and a resource bundling size in the resource bundling size set; or the receive end device determines a resource bundling size set and a resource bundling size in the resource bundling size set based on an indication of Radio Resource Control signaling sent by the transmit end device; or the receive end device determines a corresponding resource bundling size in a resource bundling size set based on an indication of downlink control signaling or Media Access Control control element MAC CE signaling sent by the transmit end device; or the receive end device determines, based on the default system configuration parameter, a resource bundling size set corresponding to the system configuration parameter, and then determines a corresponding resource bundling size in the resource bundling size set based on an indication of air interface signaling, for example, RRC, DCI, or MAC CE signaling.

In addition, the receive end device performs channel estimation or data demodulation after determining the resource bundling size.

The following describes, by using the physical resource block (PRB) bundling size as an example, how a correspondence between a resource bundling size set and one or more system configuration parameters is configured in the step of generating, by the transmit end device, the configuration information in the method 200 in this embodiment of this application. For other resource bundling sizes such as the resource scheduling frequency domain size, the precoding frequency domain size, and the channel state information feedback frequency domain size, principles are similar thereto. Therefore, descriptions about the PRB bundling size in all the embodiments of this application are also applicable to the resource scheduling frequency domain size, the precoding frequency domain size, and the channel state information feedback frequency domain size, and details are not described again. In addition, for the purpose of convenient description, a network device is used as the transmit end device, and a terminal is used as the receive end device.

Embodiment 1: It is agreed that a PRB bundling size set is bound to system bandwidth.

TABLE 1

| System bandwidth (MHz) | Physical resource group size set (PRG size set) |
|---|---|
| ≤5 | {1, 2, 4} |
| ≤20 | {1, 4, 6} |

TABLE 1-continued

| System bandwidth (MHz) | Physical resource group size set (PRG size set) |
|---|---|
| ≤50 | {8} |
| ≤100 | {10} |

A physical resource group size set may indicate a plurality of physical resource block bundling sizes, and {1, 2, 4} is a physical resource group size set or a physical resource bundling size set, or may be briefly referred to as a physical resource group set or a physical resource bundling set. The set corresponds to the system bandwidth ≤5. In the physical resource group size set {1, 2, 4}, 1 indicates that one physical resource block is bundled to form one physical resource block group, and 2 indicates that two physical resource block is bundled to form one physical resource block group.

When the system bandwidth is ≤20, a PRG size set corresponding to the system bandwidth may be {1, 4, 6}.

When the system bandwidth is ≤50, a PRG size set corresponding to the system bandwidth may be {8}. The set {8} includes only one value 8. In other words, the system bandwidth ≤50 corresponds to one PRG size 8.

When the system bandwidth is ≤100, a PRG size set corresponding to the system bandwidth may be {10}. It may be considered that the PRG size set includes only one value 10, that is, the system bandwidth ≤100 corresponds to one PRG size 10.

In conclusion, a mapping relationship between a physical resource group size set and system bandwidth may vary, and a quantity of physical resource group sizes in a physical resource group size set may also vary and may include only one value.

Other resource bundling sizes such as the resource scheduling frequency domain size, the precoding frequency domain size, and the channel state information feedback frequency domain size are similar thereto, and details are not described herein again.

In one implementation, a correspondence between a PRB bundling size set and system bandwidth is agreed between the network device and the terminal, specifically as follows:

Larger system bandwidth indicates a larger (at least the same) maximum PRB bundling size in a PRB bundling size set corresponding to the system bandwidth.

Each PRB bundling size in the PRB bundling size set is a divisor of a scheduling size (RBG) (corresponding to the system bandwidth).

A first value in each PRB bundling size set is a default value. When the network device does not configure a PRB bundling size, by default the terminal uses a first value in the PRB bundling size set agreed in a protocol.

In another implementation, the network device configures a PRB bundling size set for the terminal. When configuring the PRB bundling size set, the network device needs to consider a channel estimation capability of the terminal. The capability is reported by the terminal in advance.

In still another implementation, the network device configures a PRB bundling size in a particular PRB bundling size set for the terminal.

In the foregoing three implementations, the network device may explicitly or implicitly configure a PRB bundling size, specifically as follows:

Alt1: If configuration information sent by the network device to the terminal does not have explicit signaling, by default the terminal uses a value of an element that represents a PRB bundling size in a PRB bundling size set corresponding to a system parameter as a valid value (element value), where the valid value is a PRB bundling size finally determined by the terminal, for example, a value of a first or last element.

Alt2: Configure, by using RRC signaling, a value of an element in a corresponding set as a valid value.

Alt3: Configure, by using DCI, a value of an element in a corresponding set as a valid value.

Alt4: Based on statistical channel information, configure, by using RRC, values of elements in a corresponding set as valid values, and configure, by using DCI, a value of a specific element as a valid value.

After configuring a mapping relationship between a PRB bundling size set and system bandwidth, the network device sends the mapping relationship to each terminal by using configuration information, and each terminal obtains a PRB bundling size based on the configuration information, to perform channel estimation.

Embodiment 2: It is agreed that a PRB bundling size set is bound to a system radio carrier frequency (system radio carrier frequency, RCF) parameter.

TABLE 2

| System radio carrier frequency (system RCF) | Physical resource group size (PRG size) |
| --- | --- |
| 4 GHz | {1, 2} |
| 30 GHz | {4, 6, 8} |
| 70 GHz | {5, 10, 15} |
| others | {10, 15, full bandwidth} |

In one implementation, a correspondence between a PRB bundling size set and a system radio carrier frequency is agreed in a protocol.

A higher system radio carrier frequency indicates a larger (at least the same) maximum PRB bundling size in a PRB bundling size set corresponding to the system radio carrier frequency.

Each PRB bundling size in the PRB bundling size set is a divisor of a scheduling size (RBG) (corresponding to system radio carrier frequency).

The first or the last value in each PRB bundling size set is a default value. When the network device does not configure a PRB bundling size, by default the terminal uses a first or last value in the PRB bundling size set agreed in a protocol.

In another implementation, the network device configures a PRB bundling size set for the terminal.

During the configuration, the network device needs to consider a channel estimation capability of the terminal. The capability is reported by the terminal in advance.

In still another implementation, the network device configures a PRB bundling size in a particular PRB bundling size set for the terminal.

Similarly, in the foregoing three implementations, the network device may explicitly or implicitly configure a PRB bundling size, specifically as follows:

Alt1: If configuration information sent by the network device to the terminal does not have explicit signaling, by default the terminal uses a value of an element that represents a PRB bundling size in a PRB bundling size set corresponding to a system parameter as a valid value (element value), where the valid value is a PRB bundling size finally determined by the terminal, for example, a value of a first or last element.

Alt2: Configure, by using RRC, a value of an element in a corresponding set as a valid value.

Alt3: Configure, by using DCI, a value of an element in a corresponding set as a valid value.

Alt4: Based on statistical channel information, configure, by using RRC, values of elements in a corresponding set as valid values, and configure, by using DCI, a value of a specific element as a valid value.

After configuring a mapping relationship between a PRB bundling size set and system radio carrier frequency, the network device sends the mapping relationship to each terminal by using configuration information, and each terminal obtains a PRB bundling size based on the configuration information, to perform channel estimation.

Embodiment 3: It is agreed that a PRB bundling size set is bound to a system subcarrier spacing (system subcarrier spacing).

TABLE 3

| System subcarrier spacing (system Scs) | Physical resource group size (PRG size) |
| --- | --- |
| 15k | {5, 10, 15} |
| 30k | {4, 5, 10} |
| 60k | {2, 4} |
| >60k | {1, 2} |

In one implementation, a correspondence between a PRB bundling size set and a system subcarrier spacing is agreed.

A larger system subcarrier spacing indicates a smaller (at least the same) maximum PRB bundling size in a PRB bundling size set corresponding to the system subcarrier spacing.

Each PRB bundling size in the PRB bundling size set is a divisor of a scheduling size (RBG) (corresponding to system subcarrier spacing).

A first or last value in each PRB bundling size set is a default value. When the network device does not configure a PRB bundling size, by default the terminal uses a first or last value in the PRB bundling size set agreed in a protocol.

In another implementation, the network device configures a PRB bundling size set for the terminal.

During the configuration, the network device needs to consider a channel estimation capability of the terminal. The capability is reported by the terminal in advance.

In still another implementation, the network device configures a PRB bundling size in a particular PRB bundling size set for the terminal.

In the foregoing three implementations, the network device may explicitly or implicitly configure a PRB bundling size, specifically as follows:

Alt1: If configuration information sent by the network device to the terminal does not have explicit signaling, by default the terminal uses a value of an element that represents a PRB bundling size in a PRB bundling size set corresponding to a system parameter as a valid value (element value), where the valid value is a PRB bundling size finally determined by the terminal, for example, a value of a first or last element.

Alt2: Configure, by using RRC, a value of an element in a corresponding set as a valid value.

Alt3: Configure, by using DCI, a value of an element in a corresponding set as a valid value.

Alt4: Based on statistical channel information, configure, by using RRC, values of elements in a corresponding set as valid values, and configure, by using DCI, a value of a specific element as a valid value.

After configuring a mapping relationship between a PRB bundling size set and system subcarrier spacing, the network device sends the mapping relationship to each terminal by using configuration information, and each terminal obtains a PRB bundling size based on the configuration information, to perform channel estimation.

Embodiment 4: It is agreed that a PRB bundling set is bound to a plurality of system parameters (for example, RCF and bandwidth).

TABLE 4

| System radio carrier frequency (system RCF) | System bandwidth (system bandwidth) | Physical resource group size (PRG size) |
|---|---|---|
| Up to 3 GHz | ≤5M | {1, 2, 4, scheduling bandwidth for a terminal} |
| | ≤10M | {4, 6, scheduling bandwidth for a terminal} |
| | ≤20M | {6, 8, 10} |
| | Others | {8, 10, 12, scheduling bandwidth for a terminal} |
| From 3 to 6 GHz | ≤50M | {10, 15, scheduling bandwidth for a terminal} |
| | ≤100M | {15, 20} |
| | Others | {20, 25, scheduling bandwidth for a terminal} |
| 6-52.6 GHz Others | ... | ... |

A PRB bundling size set configured by the network device includes a PRG size corresponding to a user configuration parameter. The user configuration parameter includes scheduling bandwidth for a terminal. In another implementation, the user configuration parameter may alternatively be minimum continuous scheduling bandwidth for the terminal or a divisor of continuous scheduling bandwidth for the terminal. The resource bundling size corresponding to the user configuration parameter may be a status variable. For example, the status variable instructs a target terminal to use entire or partial scheduling bandwidth. For example, in a current scheduling process, 10 physical resource blocks (Physical Resource Block, PRB) are scheduled for the terminal, and when a parameter is indicated, a size is 10 PRBs; or 20 PRBs are scheduled for the terminal in a scheduling process, and when another parameter is indicated, a size is 20 PRBs. A process of sending corresponding configuration information by the network device is similar to that in Embodiment 1 to Embodiment 3, and details are not described herein again.

Embodiment 5: It is agreed that a PRB bundling set is bound to a transmission scheme (TS).

TABLE 5

| Transmission scheme (TS) | Physical resource group size (PRG size) |
|---|---|
| SFBC | {5, 10, 15} |
| Open-loop | {4, 5, 10} |
| Semi-open loop | {2, 4} |
| RE-level precoding cycling | {1, 2} |

Processes of configuring a PRB bundling size and sending corresponding configuration information by the network device are similar to those in Embodiment 1 to Embodiment 4, and details are not described herein again.

In Embodiment 1 to Embodiment 5, the PRB bundling size set is used as an example to describe an implementation process in which the transmit end device configures a relationship between a resource bundling size set and a system configuration parameter, and sends the relationship to the receive end device.

In Embodiment 6, a process in which the receive end device reports, to the transmit end device, information indicating a resource bundling size is described.

In Embodiment 6, that the transmit end device is a network device and the receive end device is a terminal is still used as an example for description.

The receive end device, namely, the terminal determines a resource bundling size that the terminal needs to feed back, and sends a message to the network device to report or feed back the resource bundling size.

In an implementation, the resource bundling size fed back by the terminal is a resource bundling size that the network device should use; or the resource bundling size fed back by the terminal may be merely used as a resource bundling size suggested by the terminal for a network device, and the network device determines an actually to-be-used resource bundling size.

In a specific implementation, the terminal may determine the resource bundling size by using a plurality of implementation methods:

For example, the terminal may first determine a proper resource bundling size through channel measurement. For example, the terminal may receive a downlink reference signal, to measure a frequency domain channel, calculate channel coherent bandwidth, and determine a proper resource bundling size based on the channel coherent bandwidth.

For another example, the terminal may collect statistics about a relationship between a resource bundling size and transmission performance under parameter conditions, such as a location, a movement speed, time, a carrier frequency, bandwidth, and a service characteristic of the terminal, to determine an optimal resource bundling size for each parameter value, and then select a current optimal resource bundling size based on a current parameter value of the terminal.

For another example, the network device may send a rule or a parameter (for example, a coherent bandwidth threshold or a resource bundling size adjustment factor) to the terminal, so that the terminal determines a resource bundling size based on the rule or the parameter and a parameter condition of the terminal.

In a specific implementation, the terminal may feed back the resource bundling size to the network device by using a plurality of implementation methods:

For example, the terminal directly sends a message to the network device, to indicate how many RBs the resource bundling size includes.

For another example, the terminal sends a message to the network device, to indicate a resource bundling size change. For example, one bit is used to indicate unchanged/changed, or two bits are used to indicate decreased/unchanged/increased/a jump, or the like.

For another example, based on a basic resource bundling size agreed in advance (for example, the basic resource bundling size is determined based on an agreement in a standard) or based on a basic resource bundling size configured by using network signaling (for example, the basic resource bundling size is determined based on the method of Embodiment 1), the terminal sends a message to the network device, to indicate a multiple relationship between the resource bundling size and the basic resource bundling size.

For another example, the terminal sends information to the transmit end device based on a plurality of resource bundling size configuration tables that are agreed in advance with the network device, to indicate a specific resource bundling size configuration table for use by the resource bundling size determined by the terminal. Specifically, based on a resource bundling size table (for example, Table 6) agreed in advance, the terminal sends a message to the network device, to indicate a column in the table to be used by the determined resource bundling size (for example, indicate that a value of a case is 0 or 1).

TABLE 6

Resource bundling size suggested by the terminal

| System bandwidth ($N_{RB}^{DL}$) | Resource bundling Size (P') (PRBs) | |
|---|---|---|
| | case 0 | case 1 |
| ≤10 | 1 | 2 |
| 11-26 | 2 | 3 |
| 27-63 | 3 | 4 |
| 64-110 | 2 | 4 |

For another example, based on a plurality of resource bundling size tables agreed in advance, the terminal sends a message to the network device, to indicate a table to be used by the resource bundling size.

In a specific implementation, the message sent by the terminal to the network device may be used to feed back only one resource bundling size, or may be used to feed back a plurality of (suggested) resource bundling sizes. The plurality of resource bundling sizes may be fed back by sending one message, or may be fed back by sending a plurality of messages. When the plurality of resource bundling sizes are fed back by sending one message, the message may carry a plurality of IEs. Each IE indicates one resource bundling size. Alternatively, the message may carry only one IE to simultaneously indicate the plurality of resource bundling sizes. For example, a table shown in Table 7 is used, and one bit may be used to indicate a resource bundling size or a suggested range of resource bundling sizes. The range may include a plurality of resource bundling sizes.

TABLE 7

Resource bundling size suggested by the terminal (supporting simultaneous indication of a plurality of resource bundling sizes)

| System bandwidth ($N_{RB}^{DL}$) | Resource bundling size Size (P') (PRBs) | |
|---|---|---|
| | case 0 | case 1 |
| ≤10 | 1 | 1-2 |
| 11-26 | 2 | 3-4 |
| 27-63 | 2-3 | 4 |
| 64-110 | 2-3 | 4-6 |

The method in Embodiment 6 may also be used by the terminal to send a message to the network device to indicate another resource bundling size, for example, indicate a CSI feedback bundling size, such as a sub-band (SB) size, or indicate a resource scheduling bundling size, such as a resource block group (RBG) size.

In the foregoing embodiments, a value in a resource bundling size set may be an integer, or may be a multiple of a known size such as an RBG, as shown in Table 8:

TABLE 8

| Transmission scheme (TS) | Resource bundling size Size (unit: RBG) |
|---|---|
| SFBC | {0.5, 0.25, 2} |
| Open-loop | {0.5, 1, 2} |

In Embodiment 1 to Embodiment 6, that a PRB bundling size set is bound to a system configuration parameter is mainly used as an example for description, and the system configuration parameter is a value range, so that different system configuration parameters adapt to different scenarios to improve estimation performance.

In a simple implementation, one resource bundling size set corresponds to one system configuration parameter; and one resource bundling size set has only one resource bundling size, or one resource bundling size set has a plurality of resource bundling sizes. The following describes an implementation process of this case by using Embodiment 7.

Herein, this concept is described by using physical resource block configuration information and the existing LTE standard as an example. In an LTE system, a physical resource block group PRG is used to indicate a width of a frequency band for channel estimation, and this application is similar to the LTE system hereto.

The physical resource block configuration information in the method 200 may include a frequency bandwidth parameter. In this case, frequency bandwidth indicated by the physical resource block configuration information is equal to a product of multiplying the frequency bandwidth parameter by reference frequency bandwidth. Optionally, the reference frequency bandwidth is equal to frequency bandwidth of a resource unit. The resource unit may be a resource block (RB for short) in the LTE standard, or may be a newly defined unit similar to the RB. In addition, the frequency bandwidth parameter may be a specific numerical value. For example, the frequency bandwidth parameter is a numerical value 3, and the resource unit is indicated by using the RB in the LTE standard. Then the frequency bandwidth indicated by the physical resource block configuration information is frequency bandwidth of three RBs. To be specific, a width of a frequency band for a physical resource block configuration is 540 kHz (3×12×15 kHz). It should be noted that in a specific implementation process, the reference frequency bandwidth may alternatively be another width, for example but not limited to, a subcarrier spacing.

Optionally, the physical resource block configuration information in the method 200 may further include a width value of a frequency band for channel estimation or an index of the width value, and the width value or the index of the width value is used to determine a width of the frequency band for channel estimation. For example, physical resource block configuration information generated by the transmit end device carries a specific width value used to indicate a width of a frequency band for channel estimation. For example, the width value may be 180 kHz, and the width value 180 kHz is a width of the frequency band for channel estimation that is indicated by the transmit end device to the receive end device and that is optimal in a particular scenario. The scenario may be a high frequency scenario (with a radio carrier frequency higher than 6 GHz), a low frequency scenario (with a radio carrier frequency lower than 6 GHz), or the like, and the scenario may be set depending on a specific need, which is not limited herein. For another example, physical resource block configuration information generated by the transmit end device carries an index used to indicate a width value of a frequency band for channel estimation, and after receiving the index, the receive end device can determine, based on a correspondence agreed in advance between the width value and the index, an optimal width of the frequency band for channel estimation that is indicated by the transmit end device to the receive end device. Specifically, for the correspondence between the width value and the index, refer to Table 9 below.

TABLE 9

| Index | Frequency bandwidth |
|---|---|
| 0 | 180 kHz |
| 1 | 360 kHz |
| 2 | 720 kHz |
| 3 | 1080 kHz |

In an implementation, the physical resource block configuration information in the method 200 may further include an index of a width mapping rule. The width mapping rule records a correspondence between system bandwidth and a width of a frequency band for channel estimation. The index of the width mapping rule is used to indicate the width mapping rule. In this case, the receive end device may determine the frequency bandwidth based on the width mapping rule and the system bandwidth. For example, physical resource block configuration information generated by the transmit end device carries an index used to indicate a width mapping rule, and the width mapping rule is determined by using the index. The mapping rule may be indicated in a table form, or may be indicated in another form. Using the LTE standard as an example, for the table form, refer to Table 10 below (for ease of description, the index is represented by idx, the width of the frequency band is represented by P, and a unit of the frequency bandwidth is represented by a physical resource block PRB in the prior art). The correspondence between the system bandwidth and the width of the frequency band for channel estimation is determined based on a value of the index idx. For example, a value of idx is 0, the system bandwidth is 11 to 26 PRBs, and P is equal to two PRBs, namely, 360 kHz.

TABLE 10

| System bandwidth | P (PRBs) | |
|---|---|---|
| ($N_{RB}^{DL}$) | idx = 0 | idx = 1 |
| ≤10 | 1 | 2 |
| 11-26 | 2 | 3 |
| 27-63 | 3 | 4 |
| 64-110 | 2 | 4 |

Preferably, the physical resource block configuration information in the method 200 may further include a width update parameter. The width update parameter is used to update a current width of a frequency band for channel estimation. For example, physical resource block configuration information generated by the transmit end device carries a width update parameter, and the width update parameter is used to indicate an update that needs to be made to the current width of the frequency band for channel estimation. Specific update content may be indicated in a calculation formula form. For details, refer to Table 11 below (for ease of description, the width update parameter is represented by CASE, the current width of the frequency band for channel estimation is represented by P, an updated width of the frequency band is represented by P*, and a unit of the frequency bandwidth is represented by a physical resource block PRB in the prior art). An updated width, corresponding to corresponding system bandwidth, of the frequency band for channel estimation is determined based on a value of the width update parameter CASE (for example, the value of CASE is 0 or 1).

TABLE 11

| System bandwidth | P* (PRBs) | |
|---|---|---|
| ($N_{RB}^{DL}$) | case 0 | case 1 |
| ≤10 | P* = P + 1 | P* = P − 1 |
| 11-26 | P* = P + 2 | P* = P |
| 27-63 | P* = P × 2 | P* = P/2 |
| 64-110 | P* = P | P* = P |

In a specific implementation process, in step 204, the transmit end device sends the physical resource block configuration information to the receive end device by using a determined resource. The physical resource block configuration information may be sent by using one of the following signaling types: broadcast signaling; unicast signaling; physical layer signaling; Media Access Control layer signaling; and Radio Resource Control signaling.

In the foregoing embodiment, the physical resource block configuration information is used as an example for description. For the resource scheduling configuration information corresponding to the resource scheduling frequency domain size, or the precoding configuration information corresponding to the precoding frequency domain size, or the channel state information feedback configuration information corresponding to the channel state information feedback frequency domain size, or the transmission scheme configuration information, an implementation is similar thereto, and details are not described herein again.

In addition, the function of the physical resource block bundling size is not limited to channel estimation, but the physical resource block bundling size may also be used for data demodulation and the like. This is well-known to a person skilled in the art, and is not described in detail herein again.

It can be easily learned that the transmit end device generates resource configuration information, and the receive end device may determine a resource bundling size based on the resource configuration information. Compared with the prior art in which a resource size is bound only to system bandwidth, the technical solution provided in this embodiment of this application can flexibly determine a proper resource bundling size from a resource bundling size set, to adapt to different application scenarios. Therefore, by using the technical solution provided in this embodiment of this application, a requirement of a wireless communications system for diversified scenarios can be met, and system performance can be effectively optimized in different scenarios.

Figure 3:
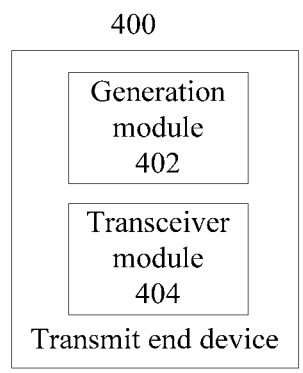
FIG. 3 is a schematic diagram of a logical structure of a transmit end device according to an embodiment of this application.

FIG. 3 is a schematic diagram of a logical structure of a transmit end device 400 according to an embodiment of this application. In a specific implementation process, the transmit end device may be, for example but not limited to, the terminal devices 108 to 122 or the base stations 102 to 106 in FIG. 1. As shown in FIG. 3, the device 400 includes a generation module 402 and a transceiver module 404.

The generation module 402 is configured to generate configuration information, where the configuration information is used to indicate at least one resource bundling size, the resource bundling size belongs to a resource bundling size set, and the resource bundling size set corresponds to at least one system configuration parameter.

The transceiver module 404 is configured to send the configuration information generated by the generation module 402.

The resource bundling size set generated by the generation module 402 corresponds to at least one system configuration parameter. In addition, the system configuration parameter includes at least one of a system radio carrier frequency parameter, a system bandwidth parameter, a system subcarrier spacing parameter, a service scenario parameter, and a transmission scheme parameter.

In addition, the resource bundling size set includes a resource bundling size corresponding to a user configuration parameter.

The transceiver module 404 sends, to a receive end device, configuration information indicating a resource bundling size set or configuration information indicating a resource bundling size in a resource bundling size set.

Specifically, the transceiver module 404 sends the configuration information to the receive end device based on channel information, or multi-user (multiple user, MU) pairing information, or a demodulation reference signal pattern.

In addition, the transceiver module 404 further sends the configuration information by using air interface signaling, for example, broadcast signaling, unicast signaling, Radio Resource Control signaling, downlink control signaling, or Media Access Control control element MAC CE signaling.

In addition, the transceiver module 404 is further configured to receive information that is reported by the receive end device and that indicates a resource bundling size.

The device 400 is configured to perform the method 200 shown in FIG. 2. Technical features related to the device 400 are described above in detail with reference to an accompanying drawing, for example but not limited to, FIG. 2. Therefore, details are not described herein again.

Figure 4:
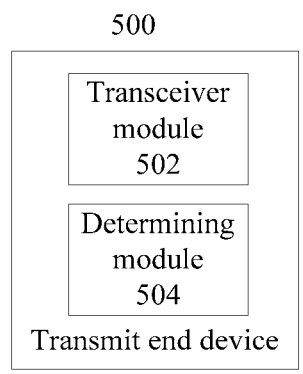
FIG. 4 is a schematic diagram of a logical structure of a receive end device according to an embodiment of this application.

FIG. 4 is a schematic diagram of a logical structure of a receive end device 500 according to an embodiment of this application. In a specific implementation process, the receive end device may be, for example but not limited to, the base stations 102 to 106 or the terminal devices 108 to 122 in FIG. 1. As shown in FIG. 4, the device 500 includes a transceiver module 502 and a determining module 504.

The transceiver module 502 is configured to receive configuration information, where the configuration information is used to indicate at least one resource bundling size, the resource bundling size belongs to a resource bundling size set, and the resource bundling size set corresponds to at least one system configuration parameter.

The determining module 504 is configured to determine a resource bundling size based on the configuration information. In addition, the determining module 504 is further configured to perform channel estimation or data demodulation after determining the resource bundling size.

In a specific implementation, the determining module 504 is further configured to determine a corresponding resource bundling size set based on a default system configuration parameter or based on an indication of air interface signaling sent by a transmit end device, or further determine a corresponding resource bundling size based on the default system configuration parameter or based on the indication of the air interface signaling sent by the transmit end device.

For example, the determining module 504 determines, based on the default system configuration parameter, a resource bundling size set corresponding to the system configuration parameter and a resource bundling size in the resource bundling size set; or the determining module 504 determines a resource bundling size set and a resource bundling size in the resource bundling size set based on an indication of Radio Resource Control signaling sent by the transmit end device; or the determining module 504 determines a corresponding resource bundling size in a resource bundling size set based on an indication of downlink control signaling or Media Access Control control element MAC CE signaling sent by the transmit end device; or the determining module 504 determines, based on the default system configuration parameter, a resource bundling size set corresponding to the system configuration parameter, and then determines a corresponding resource bundling size in the resource bundling size set based on an indication of air interface signaling, for example, RRC, DCI, or MAC CE signaling.

In an implementation, the transceiver module 502 is further configured to report, to the transmit end device, information indicating a resource bundling size. Specifically, the transceiver module 502 directly sends, to the transmit end device, information indicating how many resource blocks a resource bundling size includes; or sends, to the transmit end device, information indicating a resource bundling size change; or sends, to the transmit end device, a multiple relationship between the resource bundling size and a basic resource bundling size, where the basic resource bundling size is agreed in advance between the transmit end device and the receive end device or preconfigured based on network signaling; or sends information to the transmit end device based on a resource bundling size configuration table that is agreed in advance with the transmit end device, to indicate that the resource bundling size determined by the receive end device is one or more resource bundling sizes in the resource bundling size configuration table; or sends information to the transmit end device based on a plurality of resource bundling size configuration tables that are agreed in advance with the transmit end device, to indicate a specific resource bundling size configuration table for use by the resource bundling size determined by the receive end device.

The determining module 504 is further configured to determine the resource bundling size to be reported by the receive end device, and specifically, determine the resource bundling size to be reported by the receive end device, based on a channel measurement result, or based on a correspondence between a resource bundling size and transmission performance, or based on a parameter received by the transceiver from a network device.

The device 500 is a receive side device corresponding to the device 400, and is configured to perform the method 200 shown in FIG. 2. Technical features related to the device 500 are described above in detail with reference to an accompanying drawing, for example but not limited to, FIG. 2. Therefore, details are not described herein again.

Figure 5:
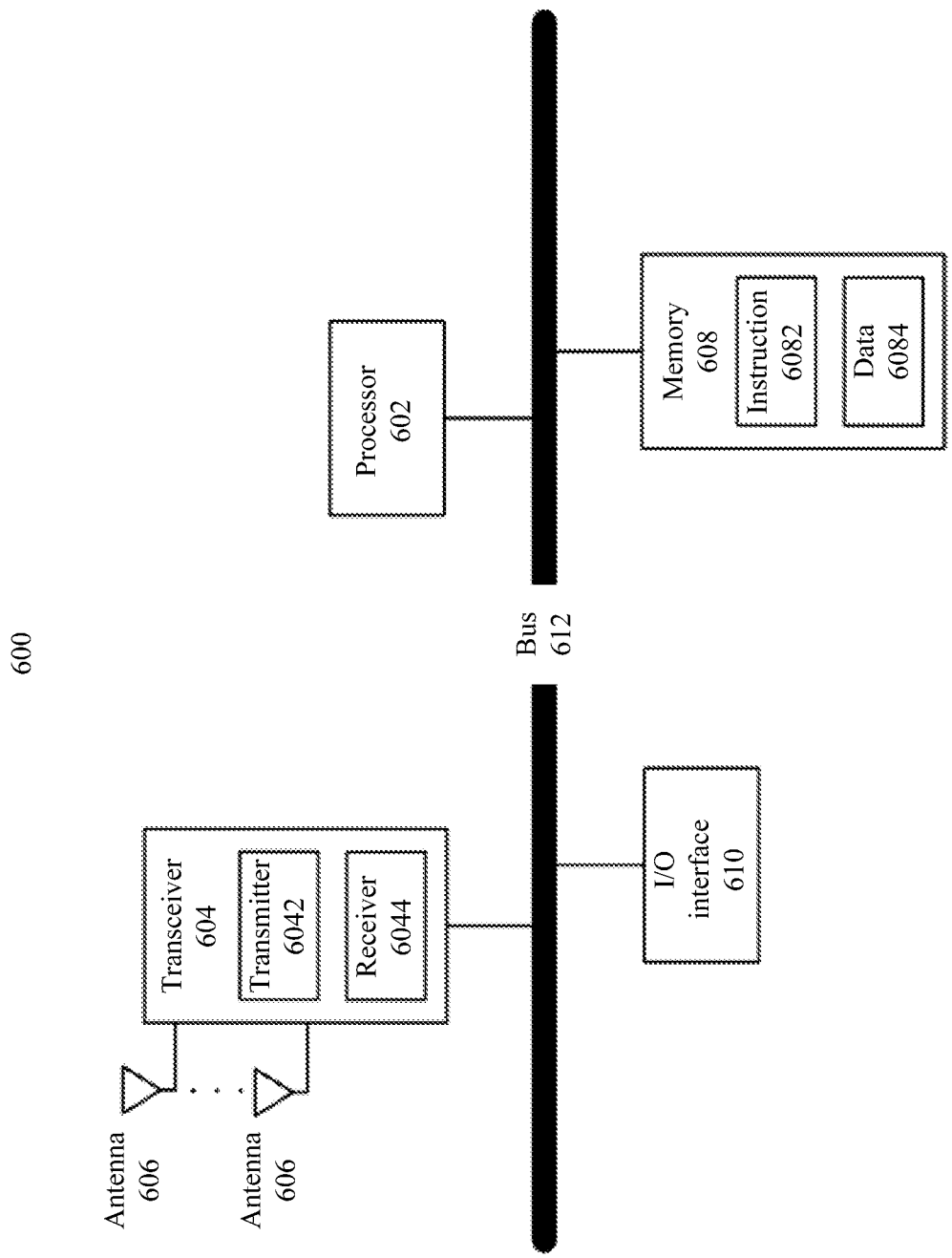
FIG. 5 is a schematic diagram of a hardware structure of a transmit end device according to an embodiment of this application.

FIG. 5 is a schematic diagram of a hardware structure of a transmit end device 600 according to an embodiment of this application. As shown in FIG. 5, the device 600 includes a processor 602, a transceiver 604, a plurality of antennas 606, a memory 608, an I/O (Input/Output) interface 610, and a bus 612. The transceiver 604 further includes a transmitter 6042 and a receiver 6044. The memory 608 is further configured to store an instruction 6082 and data 6084. In addition, the processor 602, the transceiver 604, the memory 608, and the I/O interface 610 are communicatively connected to each other by using the bus 612, and the plurality of antennas 606 are connected to the transceiver 604.

The processor 602 may be a general-purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 602 may alternatively be a combination of a plurality of processors. Particularly, in the technical solution provided in this embodiment of this application, the processor 602 may be configured to perform, for example, step 202 in the resource configuration method 200 shown in FIG. 2, and an operation performed by the generation module 402 in the transmit end device 400 shown in FIG. 3. The processor 602 may be a processor specially designed to perform the foregoing step and/or operation, or may be a processor that performs the foregoing step and/or operation by reading and executing the instruction 6082 stored in the memory 608, and the processor 602 may need to use the data 6084 when performing the foregoing step and/or operation.

The transceiver 604 includes the transmitter 6042 and the receiver 6044. The transmitter 6042 is configured to send a signal by using at least one of the plurality of antennas 606. The receiver 6044 is configured to receive a signal by using at least one of the plurality of antennas 606. Particularly, in the technical solution provided in this embodiment of this application, the transmitter 6042 may be specifically configured to perform, for example, step 204 in the resource configuration method 200 shown in FIG. 2, and an operation performed by the transceiver module 404 in the transmit end device 400 shown in FIG. 3, by using at least one of the plurality of antennas 606.

The memory 608 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. The memory 608 is specifically configured to store the instruction 6082 and the data 6084. The processor 602 may perform the foregoing step and/or operation by reading and executing the instruction 6082 stored in the memory 608, and may need to use the data 6084 when performing the foregoing step and/or operation.

The I/O interface 610 is configured to receive an instruction and/or data from a peripheral device, and output an instruction and/or data to the peripheral device.

It should be noted that in a specific implementation process, the device 600 may further include other hardware devices, which are not enumerated one by one in this specification.

Figure 6:
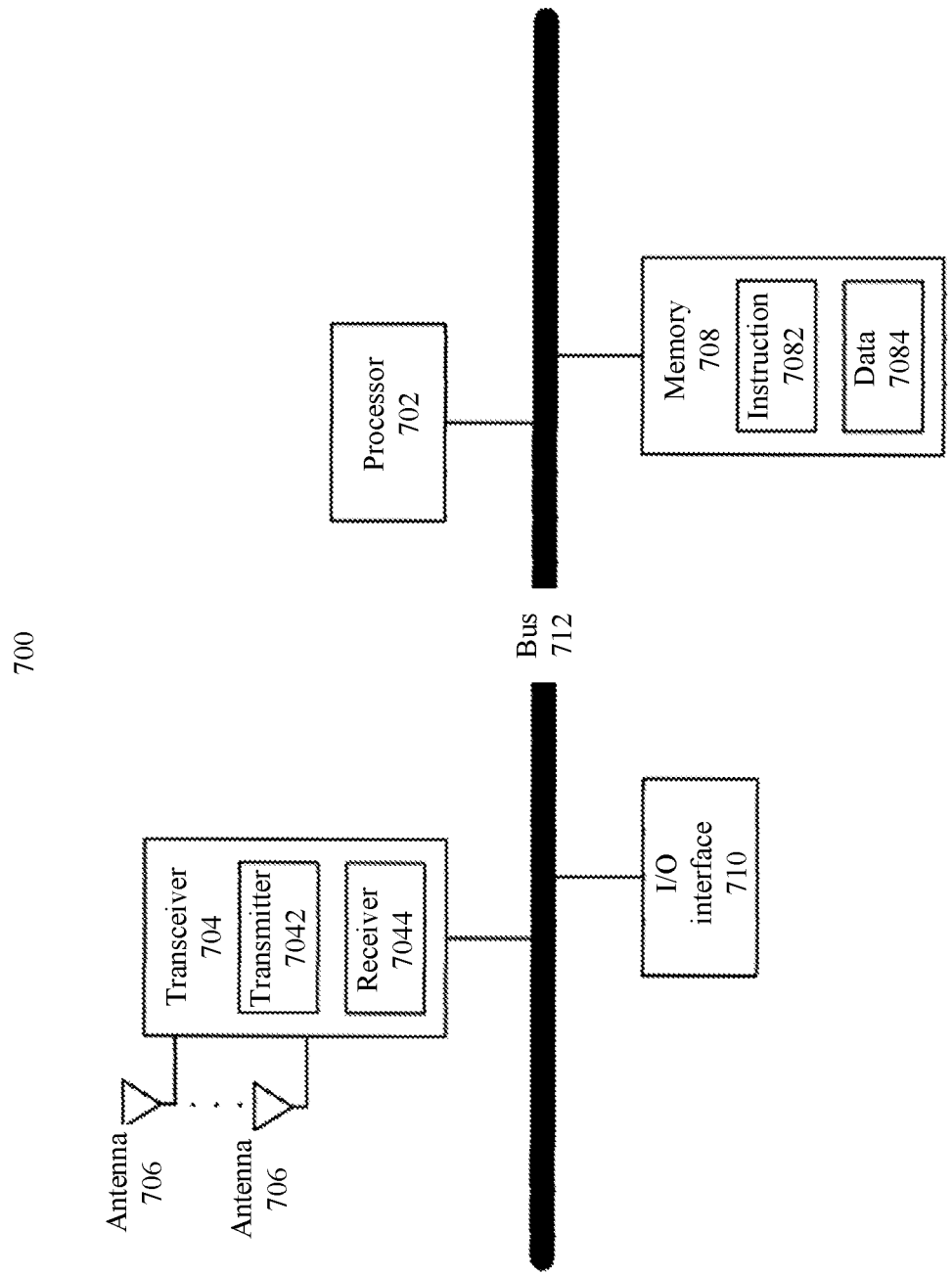
FIG. 6 is a schematic diagram of a hardware structure of a receive end device according to an embodiment of this application.

FIG. 6 is a schematic diagram of a hardware structure of a receive end device 700 according to an embodiment of this application. As shown in FIG. 6, the device 700 includes a processor 702, a transceiver 704, a plurality of antennas 706, a memory 708, an I/O (Input/Output) interface 710, and a bus 712. The transceiver 704 further includes a transmitter 7042 and a receiver 7044. The memory 708 is further configured to store an instruction 7082 and data 7084. In addition, the processor 702, the transceiver 704, the memory 708, and the I/O interface 710 are communicatively connected to each other by using the bus 712, and the plurality of antennas 706 are connected to the transceiver 704.

The processor 702 may be a general-purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 702 may alternatively be a combination of a plurality of processors. Particularly, in the technical solution provided in this embodiment of this application, the processor 702 may be configured to perform, for example, step 208 in the method 200 shown in FIG. 2, and an operation performed by the determining module 504 in the device 500 shown in FIG. 4. The processor 702 may be a processor specially designed to perform the foregoing step and/or operation, or may be a processor that performs the foregoing step and/or operation by reading and executing the instruction 7082 stored in the memory 708, and the processor 702 may need to use the data 7084 when performing the foregoing step and/or operation.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. Particularly, in the technical solution provided in this embodiment of this application, the receiver 7044 may be specifically configured to perform, for example, step 206 in the method 200 shown in FIG. 2, and an operation performed by the transceiver module 502 in the receive end device 500 shown in FIG. 4, by using at least one of the plurality of antennas 706.

The memory 708 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. The memory 708 is specifically configured to store the instruction 7082 and the data 7084. The processor 702 may perform the foregoing step and/or operation by reading and executing the instruction 7082 stored in the memory 708, and may need to use the data 7084 when performing the foregoing step and/or operation.

The I/O interface 710 is configured to receive an instruction and/or data from a peripheral device, and output an instruction and/or data to the peripheral device.

It should be noted that in a specific implementation process, the device 700 may further include other hardware devices, which are not enumerated one by one in this specification.

Figure 7:
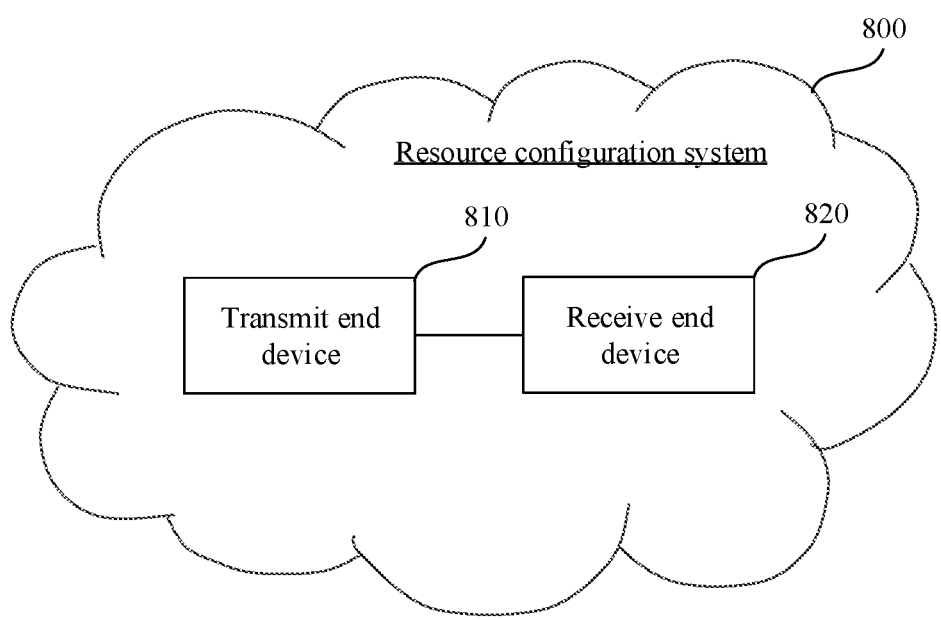
FIG. 7 is a schematic structural diagram of a resource configuration system according to an embodiment of this application.

FIG. 7 is a schematic structural diagram of a resource configuration system 800 according to an embodiment of this application. In a specific implementation process, as shown in FIG. 7, the resource configuration system 800 may include: a transmit end device 810 and a receive end device 820.

In a possible implementation, the transmit end device 810 is the transmit end device 400 shown in FIG. 3; and the receive end device 820 is the receive end device 500 shown in FIG. 4.

In another possible implementation, the transmit end device 810 is the transmit end device 600 shown in FIG. 5; and the receive end device 820 is the receive end device 700 shown in FIG. 6.

The foregoing descriptions are merely example embodiments of this application, and are not intended to limit the scope of this application. Any modification, equivalent replacement, improvement, or the like made without departing from the principle of this application should fall within the protection scope of this application. For example, when the technical solutions provided in the embodiments of this application are applied to a particular scenario or a particular condition, all other processing steps added before, during, and/or after steps of the methods provided in the embodiments of this application and other processing modules added in the apparatuses provided in the embodiments of this application to complete additional processing should be considered as further improvements based on the technical solutions provided in the embodiments of this application, and therefore fall within the scope of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource configuration method, wherein the method comprises:
    receiving, by a receive end, configuration information, wherein the configuration information indicates a resource block group (RBG) size belonging to a RBG size set, wherein the RBG size set corresponds to a configuration parameter, and the RBG size set comprises at least two RBG sizes; and
    determining, by the receive end, a RBG size based on the configuration information.

2. The resource configuration method according to claim 1, wherein the configuration parameter comprises a bandwidth parameter.

3. The resource configuration method according to claim 1, wherein the configuration information further indicates the RBG size set.

4. The resource configuration method according to claim 1, wherein the configuration information comprises resource scheduling configuration information.

5. The resource configuration method according to claim 1, wherein the RBG size is a resource scheduling frequency domain size.

6. A receive end apparatus, comprising:
    at least one processor, wherein the at least one processor is configured to couple with a memory, read an instruction in the memory, and execute the following operations:
    causing a transceiver to receive configuration information, wherein the configuration information indicates a resource block group (RBG) size belonging to a RBG size set, wherein the RBG size set corresponds to a configuration parameter, and the RBG size set comprises at least two RBG sizes; and
    determining a RBG size based on the configuration information.

7. The receive end apparatus according to claim 6, wherein the configuration parameter comprises a bandwidth parameter.

8. The receive end apparatus according to claim 6, wherein the configuration information further indicates the RBG size set.

9. The receive end apparatus according to claim 6, wherein the configuration information comprises resource scheduling configuration information.

10. The receive end apparatus according to claim 6, wherein the RBG size is a resource scheduling frequency domain size.

11. The receive end apparatus according to claim 6, wherein the receive end apparatus is a terminal device or a chip.

12. A non-transitory computer-readable storage medium, storing a computer program, wherein when the program is executed by at least one processor, cause a computer device to implement the following operations:
    receiving configuration information, wherein the configuration information indicates a resource block group (RBG) size belonging to a RBG size set, wherein the RBG size set corresponds to a configuration parameter, and the RBG size set comprises at least two RBG sizes; and determining a RBG size based on the configuration information.

13. The non-transitory computer-readable storage medium according to claim 12, wherein the configuration parameter comprises a bandwidth parameter.

14. The non-transitory computer-readable storage medium according to claim 12, wherein the configuration information further indicates the RBG size set.

15. The non-transitory computer-readable storage medium according to claim 12, wherein the configuration information comprises resource scheduling configuration information.

16. The non-transitory computer-readable storage medium according to claim 12, wherein the RBG size is a resource scheduling frequency domain size.

17. A transmit end apparatus, comprising:
at least one processor, wherein the at least one processor is configured to couple with a memory, read an instruction in the memory, and execute the following operations:
generating configuration information, wherein the configuration information indicates a resource block group (RBG) size belonging to a RBG size set, wherein the RBG size set corresponds to a configuration parameter, and the RBG size set comprises at least two RBG sizes; and
causing a transceiver to transmit the configuration information.

18. The transmit end apparatus according to claim 17, wherein the configuration parameter comprises a bandwidth parameter.

19. The transmit end apparatus according to claim 17, wherein the configuration information further indicates the RBG size set.

20. The transmit end apparatus according to claim 17, wherein the configuration information comprises resource scheduling configuration information.

21. The transmit end apparatus according to claim 17, wherein the RBG size is a resource scheduling frequency domain size.

22. The transmit end apparatus according to claim 17, wherein the transmit end apparatus is a network device or a chip.

23. A resource configuration method, comprising:
generating configuration information, wherein the configuration information indicates a resource block group (RBG) size belonging to a RBG size set, wherein the RBG size set corresponds to a configuration parameter, and the RBG size set comprises at least two RBG sizes; and
transmitting the configuration information.

24. The method according to claim 23, wherein the configuration parameter comprises a bandwidth parameter.

25. The method according to claim 23, wherein the configuration information further indicates the RBG size set.

26. The method according to claim 23, wherein the configuration information comprises resource scheduling configuration information.

27. The method according to claim 23, wherein the RBG size is a resource scheduling frequency domain size.

28. A non-transitory computer-readable storage medium, storing a computer program, wherein when the program is executed by at least one processor, cause a computer device to implement the following operations:
generating configuration information, wherein the configuration information indicates a resource block group (RBG) size belonging to a RBG size set, wherein the RBG size set corresponds to a configuration parameter, and the RBG size set comprises at least two RBG sizes; and
transmitting the configuration information.

29. The non-transitory computer-readable storage medium according to claim 28, wherein the configuration parameter comprises a bandwidth parameter.

30. The non-transitory computer-readable storage medium according to claim 28, wherein the configuration information further indicates the RBG size set.

31. The non-transitory computer-readable storage medium according to claim 28, wherein the configuration information comprises resource scheduling configuration information.

32. The non-transitory computer-readable storage medium according to claim 28, wherein the RBG size is a resource scheduling frequency domain size.

* * * * *